(12) United States Patent
Li et al.

(10) Patent No.: US 12,431,990 B2
(45) Date of Patent: Sep. 30, 2025

(54) RADIO FREQUENCY PARAMETER PROCESSING METHOD AND DEVICE, AND MOBILE TERMINAL AND STORAGE MEDIUM

(71) Applicant: HUIZHOU TCL MOBILE COMMUNICATION CO., LTD., Guangdong (CN)

(72) Inventors: Tao Li, Guangdong (CN); Kai Du, Guangdong (CN); Yangning Hong, Guangdong (CN); Zhiyuan Li, Guangdong (CN); Shengjiao Liu, Guangdong (CN)

(73) Assignee: HUIZHOU TCL MOBILE COMMUNICATION CO., LTD., Guangdong (CN)

( * ) Notice: Subject to any disclaimer, the term of this patent is extended or adjusted under 35 U.S.C. 154(b) by 495 days.

(21) Appl. No.: 17/661,049

(22) Filed: Apr. 28, 2022

(65) Prior Publication Data
US 2022/0255639 A1    Aug. 11, 2022

Related U.S. Application Data

(63) Continuation of application No. PCT/CN2020/070383, filed on Jan. 6, 2020.

(30) Foreign Application Priority Data

Oct. 29, 2019   (CN) .......................... 201911036379.0

(51) Int. Cl.
*H04B 17/11*   (2015.01)
*H04B 17/21*   (2015.01)
*H04L 5/00*    (2006.01)

(52) U.S. Cl.
CPC ............. *H04B 17/11* (2015.01); *H04B 17/21* (2015.01); *H04L 5/0044* (2013.01); *H04L 5/0064* (2013.01)

(58) Field of Classification Search
None
See application file for complete search history.

(56) References Cited

U.S. PATENT DOCUMENTS

2005/0265437 A1 * 12/2005 Yeung ..................... H04L 25/49
                                                     375/224
2010/0310005 A1 * 12/2010 Takagi ................. H04B 7/0684
                                                     375/295
(Continued)

FOREIGN PATENT DOCUMENTS

CN      101137143 A     3/2008
CN      102622283 A     8/2012
(Continued)

OTHER PUBLICATIONS

International Search Report in International application No. PCT/CN2020/070383, mailed on Jul. 29, 2020.
(Continued)

*Primary Examiner* — Saad Khawar
(74) *Attorney, Agent, or Firm* — PV IP PC; Wei Te Chung

(57) ABSTRACT

Embodiments of the present disclosure are directed to a radio frequency (RF) parameter processing method, a related device, a mobile terminal and a storage medium. The RF parameter processing method includes obtaining an RF parameter, performing a calibration process on the RF parameter to obtain a target RF parameter, wherein the target RF parameter comprises a target dynamic RF parameter, backing up the target dynamic RF parameter into a predetermined partition, and upon detecting a setting information,
(Continued)

injecting the target dynamic RF parameter stored in the predetermined partition into an activated partition.

17 Claims, 3 Drawing Sheets

(56) References Cited

U.S. PATENT DOCUMENTS

2017/0322729 A1* 11/2017 Mayer .................... G06F 3/061
2019/0222329 A1    7/2019 Abdelmonem

FOREIGN PATENT DOCUMENTS

| | | |
|---|---|---|
| CN | 105898780 A | 8/2016 |
| CN | 106102086 A | 11/2016 |
| CN | 107133060 A | 9/2017 |
| CN | 107222341 A | 9/2017 |
| CN | 107480003 A | 12/2017 |
| CN | 107656745 A | 2/2018 |
| CN | 108768548 A | 11/2018 |
| CN | 108901031 A | 11/2018 |
| CN | 109634778 A | 4/2019 |
| CN | 110022405 A | 7/2019 |
| CN | 110209529 A | 9/2019 |

OTHER PUBLICATIONS

Written Opinion of the International Search Authority in international application No. PCT/CN2020/070383, mailed on Jul. 29, 2020.
Chinese Office Action issued in corresponding Chinese Patent Application No. 201911036379.0 dated Aug. 25, 2020, pp. 1-12.

* cited by examiner

RADIO FREQUENCY PARAMETER PROCESSING METHOD AND DEVICE, AND MOBILE TERMINAL AND STORAGE MEDIUM

CROSS REFERENCE

This application is a continuation application of an International Application No. PCT/CN2020/070383, filed on Jan. 6, 2020, which claims the priority of Chinese Patent Application No. 201911036379.0, entitled "RADIO FREQUENCY PARAMETER PROCESSING METHOD AND DEVICE, AND MOBILE TERMINAL AND STORAGE MEDIUM", filed on Oct. 29, 2019, the disclosure of which is incorporated herein by reference in its entirety.

FIELD OF THE DISCLOSURE

The present disclosure relates to a mobile terminal field, and more particularly, to a radio frequency parameter processing method and a related device, a mobile terminal and a storage medium.

BACKGROUND

The mobile terminal needs radio frequency (RF) parameters to solve related issues while the mobile terminal is performing communication processes. The RF parameters comprise dynamic RF parameters and static RF parameters. For different mobile terminals having the same hardware, the static RF parameters of these mobile terminals should be identical and the dynamic RF parameters of them could be different.

Conventionally, the RF parameters, including the static RF parameters and the dynamic RF parameters, are often stored in the same activated partition. If a part of parameters need be amended, all of the RF parameters are normally required to be injected into the activated partition. Because the dynamic RF parameters of the mobile terminals are different, the mobile terminal needs to be sent back to amend the RF parameters and all RF parameters need to be re-injected. Therefore, the process of adjusting the RF parameters is often completed and cannot be quickly completed. However, if the RF parameters are not amended, the communication function may have errors and the stability of the mobile terminal might be largely reduced.

SUMMARY

Technical Problem

One objective of an embodiment of the present disclosure is to provide an RF parameter processing method and a related device, a mobile terminal and a storage medium, to raise the RF parameter amendment efficiency and the mobile terminal stability.

Technical Solution

According to an embodiment of the present disclosure, a radio frequency (RF) parameter processing method is disclosed. The RF parameter processing module comprises: obtaining a radio frequency (RF) parameter; performing a calibration process on the RF parameter to obtain a target RF parameter, wherein the target RF parameter comprises a target dynamic RF parameter; backing up the target dynamic RF parameter into a predetermined partition; and when a setting information is detected, injecting the target dynamic RF parameter stored in the predetermined partition into an activated partition.

Furthermore, the RF parameter processing method further comprises following steps before the backing up the target dynamic RF parameter into the predetermined partition:
storing the target RF parameter in the activated partition;
obtaining a dynamic RF parameter index value; and
setting the predetermined partition for the target dynamic RF parameter in the activated partition according to the dynamic RF parameter index value.

Furthermore, the backing up the target dynamic RF parameter into the predetermined partition comprises:
picking a target RF parameter corresponding to the dynamic RF parameter index value from target RF parameters in the activated partition to obtain the target dynamic RF parameter; and
backing up the obtained target dynamic RF parameter into the predetermined partition.

Furthermore, the target RF parameters and target RF parameter index values have a one-to-one correspondence. The picking the target RF parameter corresponding to the dynamic RF parameter index value from the target RF parameters in the activated partition to obtain the target dynamic RF parameter comprises:
picking a target RF parameter index value corresponding to the dynamic RF parameter index value from the target RF parameter index values to obtain the target dynamic RF parameter index value; and
picking a target RF parameter corresponding to the target dynamic RF parameter index value from the target RF parameters in the activated partition to obtain the target dynamic RF parameter.

Furthermore, the setting information comprises that the activated partition is empty. The step of injecting the target dynamic RF parameter stored in the predetermined partition into an activated partition when the setting information is detected comprises:
when the activated partition is detected to be empty, injecting the RF parameter in a candidate partition into the activated partition; wherein the RF parameter comprises the dynamic RF parameter; and
replacing the dynamic RF parameter in the activated partition with the target dynamic RF parameter in the predetermined partition.

Furthermore, the setting information comprises an RF parameter variation in a candidate partition. The step of injecting the target dynamic RF parameter stored in the predetermined partition into an activated partition when the setting information is detected comprises:
when the RF parameter variation in the candidate partition is detected, obtaining a varied RF parameter in the candidate partition;
replacing the RF parameter in the activated partition with the varied RF parameter in the candidate partition, wherein the varied RF parameter comprises a varied dynamic RF parameter; and
replacing the varied dynamic RF parameter in the activated partition with the target dynamic RF parameter in the candidate partition.

Furthermore, the RF parameter processing method further comprising following steps before the performing the calibration process on the RF parameter to obtain the target RF parameter:
storing the RF parameter in the candidate partition; and
transferring and storing the RF parameter from the candidate partition into the activated partition.

Furthermore, the performing the calibration process on the RF parameter to obtain the target RF parameter comprises:

loading a predetermined file according to the RF parameter; and performing the calibration process according to the RF parameter and the predetermined file to obtain the target RF parameter.

According to an embodiment of the present disclosure, an RF parameter processing device is disclosed. The RF parameter processing device comprises: one or more processors; a storage device; and one or more programs, stored in the storage device, configured to be executed by the one or more processors; a first obtaining module, configured to obtain an RF parameter; a calibration module, configured to perform a calibration process on the RF parameter to obtain a target RF parameter, wherein the target RF parameter comprises a target dynamic RF parameter; a backup module, configured to back up the target dynamic RF parameter into a predetermined partition; and an injecting module, configured to inject the target dynamic RF parameter stored in the predetermined partition into an activated partition when a setting information is detected.

Furthermore, the RF parameter processing device further comprises:

a storage module, configured to store the target RF parameter in the activated partition;

a second obtaining module, configured to obtain a dynamic RF parameter index value; and a setting module, configured to set the predetermined partition for the target dynamic RF parameter in the activated partition according to the dynamic RF parameter index value.

Furthermore, the backup module comprises:

a picking sub-module, configured to pick a target RF parameter corresponding to the dynamic RF parameter index value from target RF parameters in the activated partition to obtain the target dynamic RF parameter; and a backup sub-module, configured to back up the obtained target dynamic RF parameter into the predetermined partition.

Furthermore, the target RF parameters and target RF parameter index values have a one-to-one correspondence. The picking sub-module is further configured to:

pick a target RF parameter index value corresponding to the dynamic RF parameter index value from the target RF parameter index values to obtain the target dynamic RF parameter index value; and pick a target RF parameter corresponding to the target dynamic RF parameter index value from the target RF parameters in the activated partition to obtain the target dynamic RF parameter.

Furthermore, the setting information comprises that the activated partition is empty. The injection module is configured to:

inject the RF parameter in a candidate partition into the activated partition when the activated partition is detected to be empty; wherein the RF parameter comprises the dynamic RF parameter; and replace the dynamic RF parameter in the activated partition with the target dynamic RF parameter in the predetermined partition.

Furthermore, the setting information comprises an RF parameter variation in a candidate partition. The injecting module is configured to:

obtain a varied RF parameter in the candidate partition when the RF parameter variation in the candidate partition is detected;

replace the RF parameter in the activated partition with the varied RF parameter in the candidate partition, wherein the varied RF parameter comprises a varied dynamic RF parameter; and replace the varied dynamic RF parameter in the activated partition with the target dynamic RF parameter in the candidate partition.

According to an embodiment of the present disclosure, a mobile terminal is disclosed. The mobile terminal comprises: a processor; and a storage device, configured to store program instructions; wherein the processor executes the program instructions stored in the storage device to perform the above-mentioned RF parameter processing method.

According to an embodiment of the present disclosure, a non-transitory storage medium storing program instructions executable by a processor to perform the above-mentioned RF parameter processing method.

Advantageous Effect

The present disclosure discloses an RF parameter processing method, a related device, a mobile terminal, a storage medium. The method comprises: obtaining a radio frequency (RF) parameter; performing a calibration process on the RF parameter to obtain a target RF parameter, wherein the target RF parameter comprises a target dynamic RF parameter; backing up the target dynamic RF parameter into a predetermined partition; and when a setting information is detected, injecting the target dynamic RF parameter stored in the predetermined partition into an activated partition. The present disclosure injects the target dynamic RF parameter in the predetermined partition into the activated partition such that the mobile terminal could quickly complete the amendment of the RF parameter according to the actual application and ensure the communication to work normally. That is, the present disclosure could directly inject the target dynamic RF parameter in the predetermined partition into the activated partition without sending the mobile terminal back to amend the RF parameter such that the RF parameter amendment efficient and the mobile terminal stability could be both improved.

DETAILED DESCRIPTION

The present disclosure proposes a radio frequency parameter processing method, a related device, a mobile terminal and a storage medium. To help a person skilled in the art better understand the solutions of the present disclosure, the following clearly and completely describes the technical solutions in the embodiments of the present invention. It should be understood that the specific embodiments described herein are only used to explain the present application, but not to limit the present disclosure.

Figure 1:
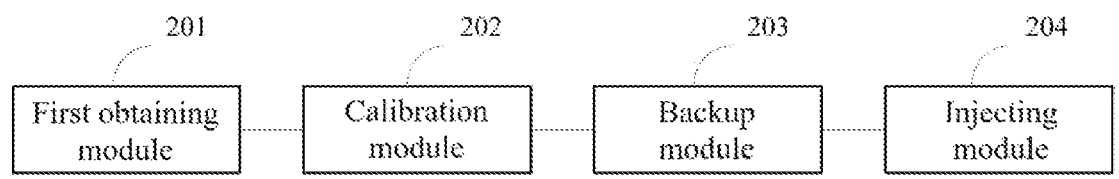
FIG. 1 is a functional block diagram of an RF parameter processing device according to an embodiment of the present disclosure.

Please refer to FIG. 1. FIG. 1 is a functional block diagram of an RF parameter processing device according to an embodiment of the present disclosure. The RF parameter processing device comprises a first obtaining module 201, a calibration module 202, a backup module 203 and an injecting module 204.

The first obtaining module 201 is used to obtain an RF parameter. The RF parameter could be stored in the mobile terminal. For example, the RF parameter could be stored in a non-volatile (NV) item in a form of files or an encryption file system (EPS) item in a form of files. The RF parameter could comprise a dynamic RF parameter and a static dynamic RF parameter. For example, for mobile terminals A having the same hardware and structure, these mobile terminal A have the same static RF parameter but have different dynamic RF parameters.

The step of obtaining RF parameter could be performed by obtaining the RF parameter from the mobile terminal or by using the mobile terminal to send a request to the external device to receive the RF parameter from the external device. For example, the mobile terminal could receive the RF parameter from the external instruments.

The calibration module 202 is used to perform a calibration process on the RF parameter to obtain target RF parameter. The target RF parameter comprises a target dynamic RF parameter.

The backup module 203 is used to back up the target dynamic RF parameter to the predetermined partition.

The injecting module 201 is used to inject the target dynamic RF parameter in the predetermined partition into the activated partition according to a setting information when the setting information is detected.

The obtaining module 201 could obtain the RF parameter. The calibration module 202 then performs a calibration process on the RF parameter to obtain the target RF parameter. The target RF parameter could comprise the target dynamic RF parameter. Then, the backup module 203 backs up the target dynamic RF parameter into the predetermined partition. When the setting information is detected, the injecting module 204 injects the target dynamic RF parameter in the predetermined partition into the activated partition according to the setting information. Because this solution injects the target dynamic RF parameter in the predetermined partition into the activated partition according to the setting information, it could allow the mobile terminal to quickly amend the RF parameter based on the actual application and to ensure the normal communication operations. The mobile terminal could directly inject the target dynamic RF parameter in the predetermined partition into the activated partition without being bent back to the factory to amend the RF parameter. This improves the RF parameter amendment efficiency and the stability of the mobile terminal.

Furthermore, the RF parameter processing device further comprises a storage module, a second obtaining module and a setting module. The storage module is configured to store the target RF parameter in the activated partition. The second obtaining module is configured to obtain a dynamic RF parameter index value. The setting module is configured to set the predetermined partition for the target dynamic RF parameter in the activated partition according to the dynamic RF parameter index value.

Because the activated partition is a region for ensuring that the mobile terminal could normally operate and store all kinds of parameters. The target RF parameter being stored into the activated partition will overwrite the previously-stored RF parameter. That is, the activated partition comprises the target RF parameter without the RF parameter. The dynamic RF parameters and the dynamic RF parameters have one-to-one correspondence. One dynamic RF parameter is often stored in one file, and the index value and the file has one-to-one correspondence. For example, the dynamic RF parameter index value could be manually or automatically picked from the RF parameters. The dynamic RF parameter index value could be in a form of a number or an alphabet and thus could be stored in an array.

The second obtaining module could obtain the dynamic RF parameter index value. For example, it might be difficult to directly obtain the dynamic RF parameter index value. Therefore, a file format transformation could be performed on the RF parameter file and then the transformed file could be read or analyzed to obtain the dynamic RF parameter index value.

And then, the setting module could set a predetermined partition for the target dynamic RF parameter in the activated partition according to the dynamic RF parameter index value. The size of the predetermined partition needs to be enough for storing the entire target dynamic RF parameter. For example, if the target dynamic RF parameter corresponding to the dynamic RF parameter index value is 5 bytes, then the predetermined partition needs to be larger than 5 bytes.

Figure 2:
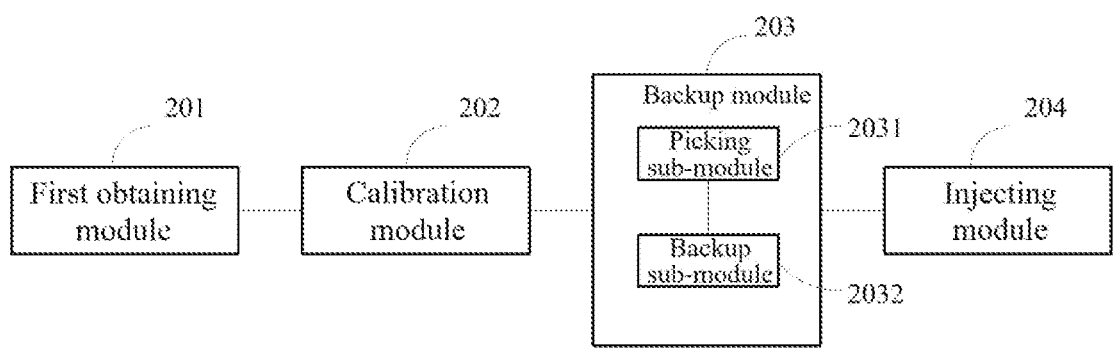
FIG. 2 is a functional block diagram of an RF parameter processing device according to another embodiment of the present disclosure.

As shown in FIG. 2, the backup module 203 comprises a picking sub-module 2031 and a backup sub-module 2032. The picking sub-module 2031 is configured to pick the target RF parameter corresponding to the dynamic RF parameter index value from target RF parameters in the activated partition to obtain the target dynamic RF parameter. The backup sub-module 2032 is configured to back up the obtained target dynamic RF parameter into the predetermined partition.

In addition, the target RF parameters and the target RF parameter index values have a one-to-one correspondence. The picking sub-module 2031 is further configured to pick a target RF parameter index value corresponding to the dynamic RF parameter index value from the target RF parameter index values to obtain the target dynamic RF parameter index value and to pick a target RF parameter corresponding to the target dynamic RF parameter index value from the target RF parameters in the activated partition to obtain the target dynamic RF parameter.

The target dynamic RF parameter index values and the target dynamic RF parameters have a one-to-one correspondence. For example, a screening operation could be performed on the target RF parameter index values according to the array carrying the dynamic RF parameter index values to retain the target RF parameter index values identical to some dynamic RF parameter index values. The process to screen the target RF parameter index values could be performed by selecting an index value from the array and picking the target RF parameter index value identical to the selected index value. The index value in the array could be orderly selected based on a certain order to ensure that each of the index value could be selected. After each index value is selected and the screen process is performed, the target dynamic RF parameter index value could be obtained. And then, based on the one-to-one correspondence between the target dynamic RF parameter index values and the target dynamic RF parameters, the target dynamic RF parameter could be obtained by picking the target RF parameters in the activated partition according to the target dynamic RF parameter index value. At this time, the target dynamic RF parameter could be backed up in the predetermined partition.

In this embodiment, the setting information comprises that the activated partition is empty. The injection module 204 is configured to inject the RF parameter in a candidate partition into the activated partition when the activated partition is detected to be empty; wherein the RF parameter comprises the dynamic RF parameter and to replace the dynamic RF parameter in the activated partition with the target dynamic RF parameter in the predetermined partition.

If the activated partition is empty, this means that no RF parameters or other data information are stored in the activated partition. The injecting module 204 transfers the RF parameters in the candidate partition to the activated partition and store RF parameters in the activated partition. At this time, the RF parameters in the activated partition are not amended. Therefore, the dynamic RF parameters in the activated partition cannot be used by the mobile terminal. So, the dynamic RF parameters need to be replaced with the target dynamic RF parameters in the predetermined partition. In this way, the activated partition stores the static RF parameters and the target dynamic RF parameters such that the mobile terminal could get the static RF parameters and the target dynamic RF parameters from the activated partition to ensure the ordinary functions of the mobile terminal.

After the mobile terminal is reset, the activated partition of the mobile terminal might be empty. In this case, if the mobile terminal is turned on and the activated partition is detected to be empty, then the injecting module 204 transfers the RF parameters in the FSG partition (the candidate partition) to the activated partition and the injecting module 204 replace the dynamic RF parameters in the activated partition with the target dynamic RF parameters in the RF partition (the predetermined partition). If the activated partition is not empty, then the mobile terminal could flexibly handle it according to the actual situation.

The setting information comprises an RF parameter variation in the candidate partition. In this case, the injecting module 204 is configured to obtain a varied RF parameter in the candidate partition when the RF parameter variation in the candidate partition is detected, replace the RF parameter in the activated partition with the varied RF parameter in the candidate partition, wherein the varied RF parameter comprises a varied dynamic RF parameter, and to replace the varied dynamic RF parameter in the activated partition with the target dynamic RF parameter in the candidate partition.

The RF parameter variance in the candidate partition could be a static RF parameter variance. The varied RF parameter in the candidate partition could be obtained and then injected to the activated partition.

If the mobile terminal performs a Firmware Over-The-Air (FOTA) upgrade, the RF parameter in the candidate partition may be changed. Thus, after the FOTA upgrade, the injecting module 204 determines whether the RF parameters in the FSG partition (the candidate partition) vary. If yes, then the injecting module 204 replaces the RF parameters in the activated partition with the varied RF parameters in the FSG partition. The varied RF parameters comprise varied dynamic RF parameters. Furthermore, the injecting module 204 replaces the varied dynamic RF parameter in the activated partition with the target dynamic RF parameters in the predetermined partition. If not, then the mobile terminal could flexibly handle it according to the actual situation.

In addition, the RF parameter processing device further comprises a storage module and a transferring module. The storage module is configured to store the RF parameter into the candidate partition. The transferring module is configured to transfer the RF parameter in the candidate partition to the activated partition for storage.

For example, after the mobile terminal obtains the RF parameters, the RF parameters are stored in the candidate partition (the FSG partition) and then the RF parameters stored in the FSG partition are transferred to the activated partition (FS1/FS2 partition, i.e. File System 1/2 partition) and stored in the activated partition. After the mobile terminal obtains the RF parameters, the candidate partition of the mobile terminal directly stores the RF parameters. After the mobile terminal is turned on, the activated partition is a partition that ensures the mobile terminal could normally work and store all kinds of parameters. Therefore, the RF parameters are part of the parameters stored in the activated partition.

The injecting module 202 comprises a loading sub-module and a calibration sub-module. The loading sub-module is configured to load a predetermined file according to the RF parameters. The calibration sub-module is configured to perform the parameter calibration according to the RF parameters and the predetermined file to obtain the target RF parameters.

The target RF parameters could be RF parameters by amending the RF parameters. The mobile terminal uses the target RF parameters to normally work. The target RF parameters could comprise target static RF parameters and target dynamic RF parameters.

Because the RF characteristics of the manufactured mobile terminals are different, these mobile terminals may not normally work. Therefore, an RF calibration needs to be performed according to the RF parameters. The RF calibration could comprise a transmitter power calibration, a receiver gain calibration and a voltage-controlled oscillator calibration, etc. For example, the mobile terminal could load the predetermined file according to the RF parameters and perform the parameter calibration according to the RF parameters and the predetermined file to obtain the target RF parameters. That is, the calibration could use the RF parameters in combination with different predetermined files to test the mobile terminal and generate the target RF parameters according to the test result. The predetermined file(s) could be previously stored in the mobile terminal. When the RF parameter calibration is being performed, different predetermined files could be selected according to different RF parameters.

Figure 3:
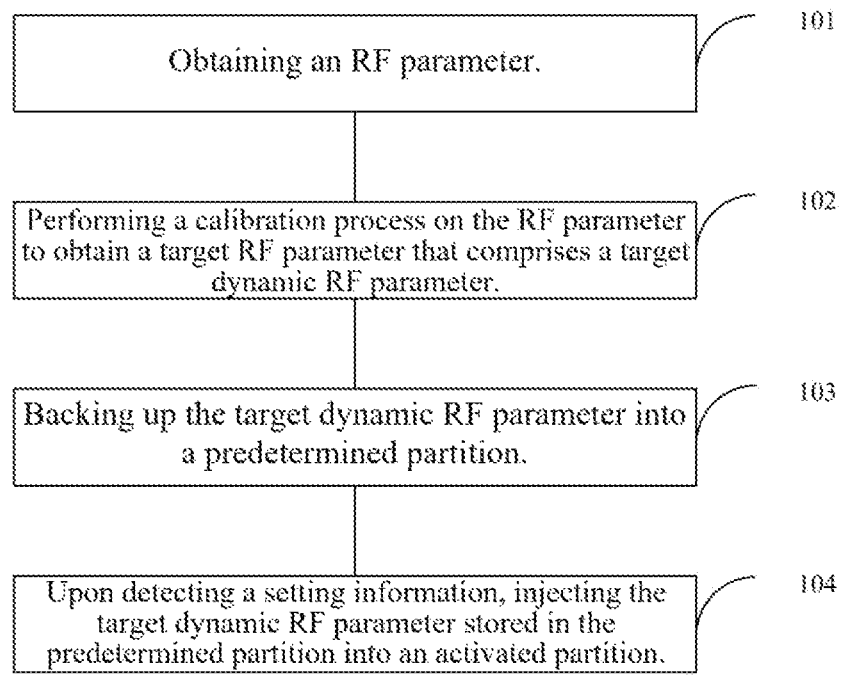
FIG. 3 is a flow chart of an RF parameter processing method according to an embodiment of the present disclosure.

As shown in FIG. 3, the present disclosure further discloses an RF parameter processing method. The RF parameter processing method comprises:

S1: obtaining a radio frequency (RF) parameter;

S2: performing a calibration process on the RF parameter to obtain a target RF parameter, wherein the target RF parameter comprises a target dynamic RF parameter;

S3: backing up the target dynamic RF parameter into a predetermined partition;

S4: when a setting information is detected, injecting the target dynamic RF parameter stored in the predetermined partition into an activated partition.

The above steps of the RF parameter processing method have been illustrated in the above embodiments of the RF parameter processing device and thus omitted here for simplicity.

In addition, the RF parameter processing method comprises following steps before the step S3: storing the target RF parameter in the activated partition; obtaining a dynamic RF parameter index value; and setting the predetermined partition for the target dynamic RF parameter in the activated partition according to the dynamic RF parameter index value.

In addition, the step S3 comprises:

S301: picking a target RF parameter corresponding to the dynamic RF parameter index value from target RF parameters in the activated partition to obtain the target dynamic RF parameter;

S302: backing up the obtained target dynamic RF parameter into the predetermined partition.

The target RF parameters and the target RF parameter index values have a one-to-one correspondence. The step 301 comprises:

S3011: picking a target RF parameter index value corresponding to the dynamic RF parameter index value from the target RF parameter index values to obtain the target dynamic RF parameter index value;

S3012: picking a target RF parameter corresponding to the target dynamic RF parameter index value from the target RF parameters in the activated partition to obtain the target dynamic RF parameter.

The setting information comprises that the activated partition is empty. The step S4 comprises: when the activated partition is detected to be empty, injecting the RF parameter in a candidate partition into the activated partition; wherein the RF parameter comprises the dynamic RF parameter; and replacing the dynamic RF parameter in the activated partition with the target dynamic RF parameter in the predetermined partition.

The setting information comprises an RF parameter variation in a candidate partition. The step S4 comprises: when the RF parameter variation in the candidate partition is detected, obtaining a varied RF parameter in the candidate partition; replacing the RF parameter in the activated partition with the varied RF parameter in the candidate partition, wherein the varied RF parameter comprises a varied dynamic RF parameter; and replacing the varied dynamic RF parameter in the activated partition with the target dynamic RF parameter in the candidate partition.

The RF parameter processing method further comprises following steps before the step S2: storing the RF parameter in the candidate partition; and transferring and storing the RF parameter from the candidate partition into the activated partition.

The present disclosure discloses an RF parameter processing method, a related device, a mobile terminal, a storage medium. The method comprises: obtaining a radio frequency (RF) parameter; performing a calibration process on the RF parameter to obtain a target RF parameter, wherein the target RF parameter comprises a target dynamic RF parameter; backing up the target dynamic RF parameter into a predetermined partition; and when a setting information is detected, injecting the target dynamic RF parameter stored in the predetermined partition into an activated partition. The present disclosure injects the target dynamic RF parameter in the predetermined partition into the activated partition such that the mobile terminal could quickly complete the amendment of the RF parameter according to the actual application and ensure the communication to work normally. That is, the present disclosure could directly inject the target dynamic RF parameter in the predetermined partition into the activated partition without sending the mobile terminal back to amend the RF parameter such that the RF parameter amendment efficient and the mobile terminal stability could be both improved.

According to an embodiment of the present disclosure, a non-transitory computer-readable storage medium is disclosed. The non-transitory computer-readable storage medium stores computer program instructions. The computer program instructions are executed by a processor to perform the above-mentioned RF parameter processing method.

A person of ordinary skill in the art can understand that all or part of the steps in the various methods of the above embodiments can be completed by instructing relevant hardware through a program, and the program can be stored in a non-transitory computer-readable storage medium, and the non-transitory computer-readable storage medium includes Read only memory (ROM), random access memory (RAM), magnetic disk or optical disk, etc.

Figure 4:
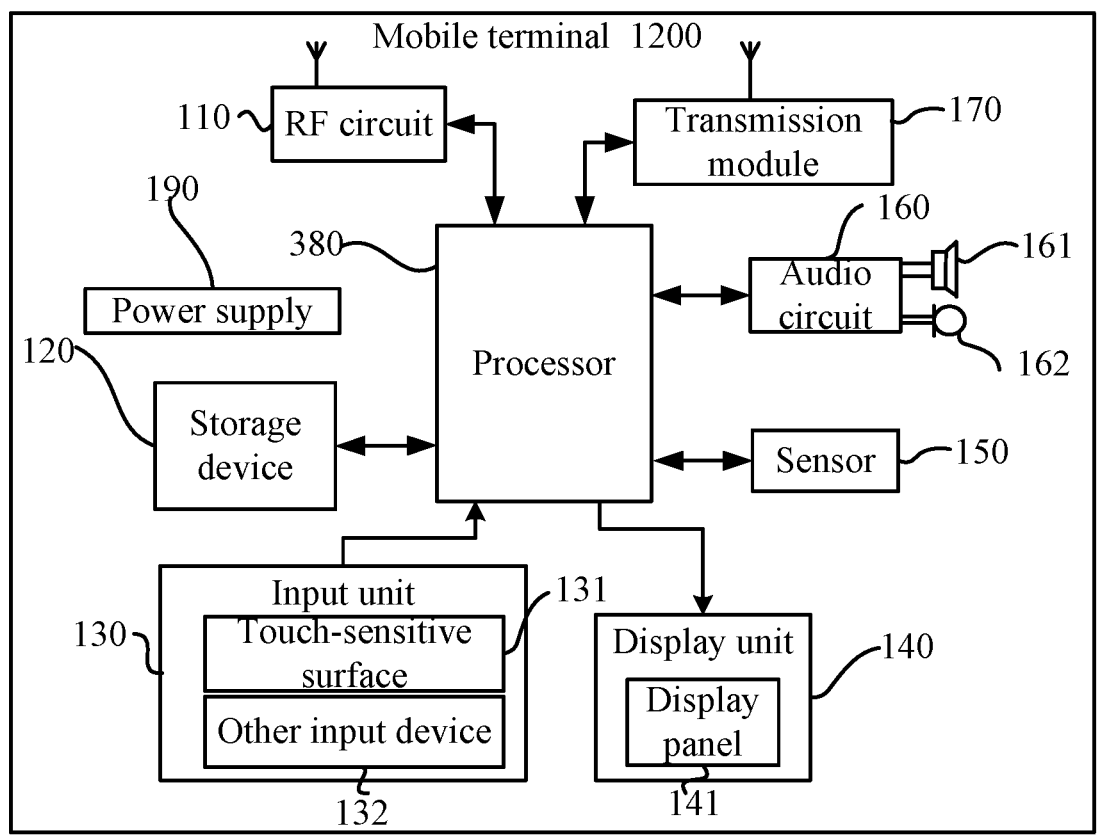
FIG. 4 is a functional block diagram of a mobile terminal according to an embodiment of the present disclosure.

Please refer to FIG. 4. FIG. 4 is a functional block diagram of a mobile terminal according to an embodiment of the present disclosure. The mobile terminal could be used to implement the RF parameter processing device/method of the above-mentioned embodiments. The mobile terminal 1200 could be a smart phone or a tablet.

As shown in FIG. 4, the mobile terminal 1200 could comprise an RF circuit 110, a storage device having a computer readable storage medium 120, an input unit 130, a display unit 140, a sensor 150, an audio circuit 160, a transmission module 170, a processor 180, a power 190, etc. The mobile terminal 1200 shown in FIG. 4 could comprise other components.

Please refer to FIG. 8. FIG. 8 is a diagram of a terminal equipment according to an embodiment of the present invention. The terminal equipment could be used to implement the communication control method of above-mentioned embodiments. The mobile terminal 1200 could be a smart phone or a tablet.

The RF circuit 110 may be configured to receive and send a signal during an information receiving and sending process or a conversation process. Specifically, after receiving downlink information from a base station, the RF circuit 110 delivers the downlink information to one or more processors 180 for processing, and sends related uplink data to the base station. Generally, the RF circuit 110 includes, but is not limited to, an antenna, at least one amplifier, a tuner, one or more oscillators, a subscriber identity module (SIM) card, a transceiver, a coupler, a low noise amplifier (LNA), and a duplexer. In addition, the RF circuit 110 may also communicate with a network and another device by wireless communication. The wireless communication may use any communications standard or protocol, which includes, but is not limited to, a Global System for Mobile communications (GSM), an Enhanced Data GSM Environment (EDGE), a Wideband Code Division Multiple Access (WCDMA), a Code Division Access (CDMA), a Time Division Multiple Access (TDMA), a Wireless Fidelity (Wi-Fi) such as IEEE 802.11a, IEEE 802.11b, IEEE802.11g and IEEE 802.11n, a Voice over Internet Protocol (VoIP), a Worldwide Interoperability for Microwave Access (Wi-Max), any other protocols for e-mail, instant communication and short message, and the like.

The storage device 120 may be configured to store a software instructions and module. The processor 180 runs the software instructions and module stored in the storage device 120, to implement various functional applications and data processing. The storage device 120 may mainly include a program storage area and a data storage area. The program storage area may store an operating system, an application program required by at least one function (such as a sound playback function and an image display function), and the like. The data storage area may store data (such as audio data and an address book) created according to use of the mobile terminal, and the like. In addition, the storage device 120 may include a high speed random access memory, and may also include a non-volatile memory, such as at least one magnetic disk storage device, a flash memory device, or another volatile solid-state storage device. Correspondingly, the storage device 120 may further include a memory controller, so that the processor 180 and the input unit 130 access the storage device 120.

The input unit 130 may be configured to receive input digit or character information, and generate keyboard, mouse, joystick, optical, or track ball signal input related to the user setting and function control. Specifically, the input unit 130 may include a touch-sensitive surface 131 and other input device 132. The touch-sensitive surface 131 may also be referred to as a touch screen or a touch panel, and may collect a touch operation of a user on or near the touch-sensitive surface (such as an operation of a user on or near the touch-sensitive surface by using any suitable object or attachment, such as a finger or a stylus), and drive a corresponding connection apparatus according to a preset program. Optionally, the touch-sensitive surface may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 180. Moreover, the touch controller can receive and execute a command sent from the processor 180. In addition, the touch-sensitive surface may be implemented by using various types, such as a resistive type, a capacitance type, an infrared type, and a surface sound wave type. In addition to the touch-sensitive surface, the input unit 130 may further include the another input device. Specifically, the another input device may include, but is not limited to, one or more of a physical keyboard, a functional key (such as a volume control key or a switch key), a track ball, a mouse, and a joystick.

The display unit 140 may be configured to display information input by the user or information provided for the user, and various graphical user ports of the mobile terminal. The graphical user ports may be formed by a graph, a text, an icon, a video, and any combination thereof. The display unit 140 may include a display panel 141. Optionally, the display panel may be configured by using a liquid crystal display (LCD), an organic light-emitting diode (OLED), or the like. Further, the touch-sensitive surface may cover the display panel. After detecting a touch operation on or near the touch-sensitive surface, the touch-sensitive surface transfers the touch operation to the processor 180, so as to determine a type of a touch event. Then, the processor 180 provides corresponding visual output on the display panel according to the type of the touch event. Although, in FIG. 4, the touch-sensitive surface and the display panel are used as two separate parts to implement input and output functions, in some embodiments, the touch-sensitive surface and the display panel may be integrated to implement the input and output functions.

The mobile terminal 1200 may further include at least one sensor 150, such as an optical sensor, a motion sensor, and other sensors. Specifically, the optical sensor may include an ambient light sensor and a proximity sensor. The ambient light sensor may adjust luminance of the display panel 141 according to brightness of the ambient light. The proximity sensor may switch off the display panel 141 and/or backlight when the mobile terminal 1200 is moved to the ear. As one type of motion sensor, a gravity acceleration sensor may detect magnitude of accelerations at various directions (which generally are triaxial), may detect magnitude and a direction of the gravity when static, and may be configured to identify an application of a mobile phone attitude (such as switching between horizontal and vertical screens, a related game, and attitude calibration of a magnetometer), a related function of vibration identification (such as a pedometer and a knock). Other sensors, such as a gyroscope, a barometer, a hygrometer, a thermometer, and an infrared sensor, which may be configured in the mobile terminal 1200 are not further described herein.

The audio circuit 160, a loudspeaker 161, and a microphone 162 may provide audio interfaces between the user and the mobile terminal 1200. The audio circuit 160 may transmit, to the loudspeaker 161, a received electric signal converted from received audio data. The loudspeaker 161 converts the electric signal into a sound signal for output. On the other hand, the microphone 162 converts a collected sound signal into an electric signal. The audio circuit 160 receives the electric signal and converts the electric signal into audio data, and outputs the audio data to the processor 180 for processing. Then, the processor 180 sends the audio data to, for example, another terminal by using the RF circuit 110, or outputs the audio data to the storage device 120 for further processing. The audio circuit 160 may further include an earplug jack, so as to provide communication between a peripheral earphone and the mobile terminal 1200.

The mobile terminal 1200 may help, by using the transmission module 170 (e.g. Wi-Fi module), a user to receive and send an e-mail, browse a webpage, and access stream media, and the like, which provides wireless broadband Internet access for the user. Although FIG. 5 shows the transmission module 170, it may be understood that, the wireless communications unit is not a necessary component of the mobile terminal 1200, and can be ignored according to demands without changing the scope of the essence of the present disclosure.

The processor 180 is a control center of the mobile terminal 1200, and connects various parts of the terminal by using various interfaces and lines. By running or executing the software instructions and/or module stored in the storage device 120, and invoking data stored in the storage device 120, the processor 180 performs various functions and data processing of the mobile terminal 1200, thereby performing overall monitoring on the mobile phone. Optionally, the processor 180 may include one or more processing cores. Preferably, the processor 180 may integrate an application processor and a modem. The application processor mainly processes an operating system, a user interface, an application program, and the like. The modem mainly processes wireless communication. It may be understood that, the foregoing modem may not be integrated into the processor 180.

The mobile terminal 1200 further includes the power supply 190 (such as a battery) for supplying power to the components. Preferably, the power supply may be logically connected to the processor 180 by using a power supply management system, thereby implementing functions, such as charging, discharging, and power consumption management, by using the power supply management system. The power supply 190 may further include any component, such as one or more direct current or alternate current power supplies, a re-charging system, a power supply fault detection circuit, a power supply converter or an inverter, and a power supply state indicator.

The mobile terminal 1200 could further comprise a camera (not shown), such as a front camera and a back camera, and a Bluetooth module (not shown) and further details are omitted. In this embodiment, the display unit of the terminal equipment is a touch panel. The terminal equipment further comprises a storage device and one or more software instructions. The one or more software instructions are stored in the storage device. One or more processors could execute the one or more software instructions to perform operations comprising:

The mobile terminal 1200 could further comprise a camera (such as a front camera and/or a back camera) and/or a Bluetooth module. In an embodiment, the display unit of the mobile terminal is a touch panel. The mobile terminal further comprises a storage device and one or more programs (program instructions). The one or more programs (program instructions) are stored in the storage device and executed by a processor to perform the following operation: obtaining a radio frequency (RF) parameter; performing a calibration process on the RF parameter to obtain a target RF parameter, wherein the target RF parameter comprises a target dynamic RF parameter; backing up the target dynamic RF parameter into a predetermined partition; and upon detecting a setting information, injecting the target dynamic RF parameter stored in the predetermined partition into an activated partition.

According to another embodiment of the present disclosure, before the backing up the target dynamic RF parameter into the predetermined partition, the processor executes the program instructions to perform following operations: storing the target RF parameter in the activated partition; obtaining a dynamic RF parameter index value; and setting the predetermined partition for the target dynamic RF parameter in the activated partition according to the dynamic RF parameter index value.

According to another embodiment of the present disclosure, during the operation of the backing up the target dynamic RF parameter into the predetermined partition, the processor executes the program instructions to perform following operations: picking a target RF parameter corresponding to the dynamic RF parameter index value from target RF parameters in the activated partition to obtain the target dynamic RF parameter; and backing up the obtained target dynamic RF parameter into the predetermined partition.

According to another embodiment of the present disclosure, the target RF parameters and target RF parameter index values have a one-to-one correspondence. During the operation of picking the target RF parameter corresponding to the dynamic RF parameter index value from the target RF parameters in the activated partition to obtain the target dynamic RF parameter, the processor executes the program instructions to perform following operations: picking a target RF parameter index value corresponding to the dynamic RF parameter index value from the target RF parameter index values to obtain the target dynamic RF parameter index value; and picking a target RF parameter corresponding to the target dynamic RF parameter index value from the target RF parameters in the activated partition to obtain the target dynamic RF parameter.

According to another embodiment of the present disclosure, the setting information comprises that the activated partition is empty. During the operation of injecting the target dynamic RF parameter stored in the predetermined partition into an activated partition when the setting information is detected, the processor executes the program instructions to perform following operations: when the activated partition is detected to be empty, injecting the RF parameter in a candidate partition into the activated partition; wherein the RF parameter comprises the dynamic RF parameter; and replacing the dynamic RF parameter in the activated partition with the target dynamic RF parameter in the predetermined partition.

According to another embodiment of the present disclosure, the setting information comprises an RF parameter variation in a candidate partition. During the operation of injecting the target dynamic RF parameter stored in the predetermined partition into an activated partition when the setting information is detected, the processor executes the program instructions to perform following operations: when the RF parameter variation in the candidate partition is detected, obtaining a varied RF parameter in the candidate partition; replacing the RF parameter in the activated partition with the varied RF parameter in the candidate partition, wherein the varied RF parameter comprises a varied dynamic RF parameter; and replacing the varied dynamic RF parameter in the activated partition with the target dynamic RF parameter in the candidate partition.

According to another embodiment of the present disclosure, before the performing the calibration process on the RF parameter to obtain the target RF parameter, the processor executes the program instructions to perform following operations: storing the RF parameter in the candidate partition; and transferring and storing the RF parameter from the candidate partition into the activated partition.

According to another embodiment of the present disclosure, during the operation of performing the calibration process on the RF parameter to obtain the target RF parameter, the processor executes the program instructions to perform following operations: loading a predetermined file according to the RF parameter; and performing the calibration process according to the RF parameter and the predetermined file to obtain the target RF parameter.

Above are embodiments of the present disclosure, which does not limit the scope of the present disclosure. Any modifications, equivalent replacements or improvements within the spirit and principles of the embodiment described above should be covered by the protected scope of the disclosure.

What is claimed is:

1. A radio frequency (RF) parameter processing method comprising:
    obtaining a radio frequency (RF) parameter;
    performing a calibration process on the RF parameter to obtain a target RF parameter, wherein the target RF parameter comprises a target dynamic RF parameter;
    backing up the target dynamic RF parameter into a predetermined partition;
    upon detecting a setting information, injecting the target dynamic RF parameter stored in the predetermined partition into an activated partition; and
    detecting a status of the activated partition;
    when the activated partition is detected to be empty, performing a real-time parameter replacement based on the status of the activated partition by injecting the RF parameter from a candidate partition into the activated partition, wherein the RF parameter comprises a dynamic RF parameter; and
    replacing the dynamic RF parameter in the activated partition with the target dynamic RF parameter in the predetermined partition;
    wherein the target dynamic RF parameter corresponding to a dynamic RF parameter index value is 5 bytes in size, the predetermined partition is larger than 5 bytes, a dynamic RF parameter calibration comprises a transmitter power calibration, a receiver gain calibration, and a voltage-controlled oscillator (VCO) calibration, during the dynamic RF parameter calibration, different preset files are selected based on different RF parameters.

2. The RF parameter processing method of claim 1, furthe comprising following steps before the backing up the target dynamic RF parameter into the predetermined partition:
storing the target RF parameter in the activated partition;
obtaining the dynamic RF parameter index value; and
setting the predetermined partition for the target dynamic RF parameter in the activated partition according to the dynamic RF parameter index value.

3. The RF parameter processing method of claim 2, wherein the backing up the target dynamic RF parameter into the predetermined partition comprises:
picking the target RF parameter corresponding to the dynamic RF parameter index value from target RF parameters in the activated partition to obtain the target dynamic RF parameter; and
backing up the obtained target dynamic RF parameter into the predetermined partition.

4. The RF parameter processing method of claim 3, wherein the target RF parameters and target RF parameter index values have a one-to-one correspondence, the picking the target RF parameter corresponding to the dynamic RF parameter index value from the target RF parameters in the activated partition to obtain the target dynamic RF parameter comprises:
picking a target RF parameter index value corresponding to the dynamic RF parameter index value from the target RF parameter index values to obtain the target dynamic RF parameter index value; and
picking the target RF parameter corresponding to the target RF parameter index value from the target RF parameters in the activated partition to obtain the target dynamic RF parameter.

5. The RF parameter processing method of claim 1, wherein the setting information comprises an RF parameter variation in a candidate partition; and the step of injecting the target dynamic RF parameter stored in the predetermined partition into an activated partition when the setting information is detected comprises:
when the RF parameter variation in the candidate partition is detected, obtaining a varied RF parameter in the candidate partition;
replacing the RF parameter in the activated partition with the varied RF parameter in the candidate partition, wherein the varied RF parameter comprises a varied dynamic RF parameter; and
replacing the varied dynamic RF parameter in the activated partition with the target dynamic RF parameter in the candidate partition.

6. The RF parameter processing method of claim 1, further comprising following steps before the performing the calibration process on the RF parameter to obtain the target RF parameter:
storing the RF parameter in the candidate partition; and
transferring and storing the RF parameter from the candidate partition into the activated partition.

7. The RF parameter processing method of claim 1, wherein the performing the calibration process on the RF parameter to obtain the target RF parameter comprises:
loading a predetermined file according to the RF parameter; and
performing the calibration process according to the RF parameter and the predetermined file to obtain the target RF parameter.

8. A radio frequency (RF) parameter processing device, comprising:
one or more processors;
a storage device; and
one or more programs, stored in the storage device, configured to be executed by the one or more processors;
a first obtaining module, configured to obtain an RF parameter;
a calibration module, configured to perform a calibration process on the RF parameter to obtain a target RF parameter, wherein the target RF parameter comprises a target dynamic RF parameter;
a backup module, configured to back up the target dynamic RF parameter into a predetermined partition; and
an injecting module, configured to inject the target dynamic RF parameter stored in the predetermined partition into an activated partition upon detecting a setting information;
wherein the injection module is configured to detect a status of the activated partition, when the activated partition is detected to be empty, the injection module is configured to perform a real-time parameter replacement based on the status of the activated partition by injecting the RF parameter from a candidate partition into the activated partition, the RF parameter comprises a dynamic RF parameter, and the injection module is configured to replace the dynamic RF parameter in the activated partition with a target dynamic RF parameter in the predetermined partition;
wherein the target dynamic RF parameter corresponding to a dynamic RF parameter index value is 5 bytes in size, the predetermined partition is larger than 5 bytes, a dynamic RF parameter calibration comprises a transmitter power calibration, a receiver gain calibration, and a voltage-controlled oscillator (VCO) calibration, during the dynamic RF parameter calibration, different preset files are selected based on different RF parameters.

9. The RF parameter processing device of claim 8, further comprising:
a storage module, configured to store the target RF parameter in the activated partition;
a second obtaining module, configured to obtain the dynamic RF parameter index value; and
a setting module, configured to set the predetermined partition for the target dynamic RF parameter in the activated partition according to the dynamic RF parameter index value.

10. The RF parameter processing device of claim 8, wherein the backup module comprises:
a picking sub-module, configured to pick the target RF parameter corresponding to the dynamic RF parameter index value from target RF parameters in the activated partition to obtain the target dynamic RF parameter; and
a backup sub-module, configured to back up the obtained target dynamic RF parameter into the predetermined partition.

11. The RF parameter processing device of claim 10, wherein the target RF parameters and target RF parameter index values have a one-to-one correspondence, and the picking sub-module is further configured to:

pick a target RF parameter index value corresponding to the dynamic RF parameter index value from the target RF parameter index values to obtain the target dynamic RF parameter index value; and pick the target RF parameter corresponding to the target dynamic RF parameter index value from the target RF parameters in the activated partition to obtain the target dynamic RF parameter.

12. The RF parameter processing device of claim 8, wherein the setting information comprises an RF parameter variation in a candidate partition; and the injecting module is configured to:

obtain a varied RF parameter in the candidate partition when the RF parameter variation in the candidate partition is detected;

replace the RF parameter in the activated partition with the varied RF parameter in the candidate partition, wherein the varied RF parameter comprises a varied dynamic RF parameter; and replace the varied dynamic RF parameter in the activated partition with the target dynamic RF parameter in the candidate partition.

13. A mobile terminal, comprising:

a processor; and a storage device, configured to store program instructions;

wherein the processor executes the program instructions stored in the storage device to perform operations comprising:

obtaining a radio frequency (RF) parameter;

performing a calibration process on the RF parameter to obtain a target RF parameter, wherein the target RF parameter comprises a target dynamic RF parameter;

backing up the target dynamic RF parameter into a predetermined partition;

upon detecting a setting information, injecting the target dynamic RF parameter stored in the predetermined partition into an activated partition; and detecting a status of the activated partition;

when the activated partition is detected to be empty, performing a real-time parameter replacement based on the status of the activated partition by injecting the RF parameter from a candidate partition into the activated partition, wherein the RF parameter comprises a dynamic RF parameter; and replacing the dynamic RF parameter in the activated partition with the target dynamic RF parameter in the predetermined partition;

wherein the target dynamic RF parameter corresponding to a dynamic RF parameter index value is 5 bytes in size, the predetermined partition is larger than 5 bytes, a dynamic RF parameter calibration comprises a transmitter power calibration, a receiver gain calibration, and a voltage-controlled oscillator (VCO) calibration, during the dynamic RF parameter calibration, different preset files are selected based on different RF parameters.

14. The mobile terminal of claim 13, wherein the operation of backing up the target dynamic RF parameter into the predetermined partition comprises:

picking the target RF parameter corresponding to the dynamic RF parameter index value from target RF parameters in the activated partition to obtain the target dynamic RF parameter; and backing up the obtained target dynamic RF parameter into the predetermined partition.

15. The mobile terminal of claim 14, wherein the target RF parameters and target RF parameter index values have a one-to-one correspondence, and the operation of picking the target RF parameter corresponding to the dynamic RF parameter index value from the target RF parameters in the activated partition to obtain the target dynamic RF parameter comprises:

picking a target RF parameter index value corresponding to the dynamic RF parameter index value from the target RF parameter index values to obtain the target dynamic RF parameter index value; and picking the target RF parameter corresponding to the target dynamic RF parameter index value from the target RF parameters in the activated partition to obtain the target dynamic RF parameter.

16. The mobile terminal of claim 13, wherein the setting information comprises an RF parameter variation in a candidate partition; and the operation of injecting the target dynamic RF parameter stored in the predetermined partition into an activated partition when the setting information is detected comprises:

when the RF parameter variation in the candidate partition is detected, obtaining a varied RF parameter in the candidate partition;

replacing the RF parameter in the activated partition with the varied RF parameter in the candidate partition, wherein the varied RF parameter comprises a varied dynamic RF parameter; and replacing the varied dynamic RF parameter in the activated partition with the target dynamic RF parameter in the candidate partition.

17. The mobile terminal of claim 13, wherein the performing the calibration process on the RF parameter to obtain the target RF parameter comprises:

loading a predetermined file according to the RF parameter; and performing the calibration process according to the RF parameter and the predetermined file to obtain the target RF parameter.

* * * * *